US012645490B2

(12) United States Patent

Sharma et al.

(10) Patent No.: US 12,645,490 B2

(45) Date of Patent: Jun. 2, 2026

(54) VARIABLE DISPATCH WALK

(71) Applicants: ADVANCED MICRO DEVICES, INC., Santa Clara, CA (US); ATI TECHNOLOGIES ULC, Markham (CA)

(72) Inventors: Saurabh Sharma, Santa Clara, CA (US); Jeremy Lukacs, Santa Clara, CA (US); Hashem Hashemi, Roseville, CA (US); Gianpaolo Tommasi, Santa Clara, CA (US); Guennadi Riguer, Markham (CA); Mark Fowler, Boxborough, MA (US); Randy Ramsey, Orlando, FL (US)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 567 days.

(21) Appl. No.: 17/557,927

(22) Filed: Dec. 21, 2021

(65) Prior Publication Data

US 2023/0195509 A1    Jun. 22, 2023

(51) Int. Cl.
*G06F 9/48* (2006.01)

(52) U.S. Cl.
CPC ................................. *G06F 9/4831* (2013.01)

(58) Field of Classification Search
CPC .............................. G06F 9/4831; G06F 9/4806
See application file for complete search history.

(56) References Cited

U.S. PATENT DOCUMENTS

| | | | | |
|---|---|---|---|---|
| 7,681,014 | B2 * | 3/2010 | Jensen | G06F 9/3858 |
| | | | | 712/214 |
| 9,514,506 | B2 * | 12/2016 | Lee | G06F 9/505 |
| 9,615,104 | B2 * | 4/2017 | Wu | H04N 19/176 |
| 10,037,149 | B2 | 7/2018 | Nazarov et al. | |
| 10,261,903 | B2 * | 4/2019 | Sakthivel | G06N 3/063 |
| 10,402,224 | B2 * | 9/2019 | Veernapu | G06T 15/005 |
| 10,521,875 | B2 * | 12/2019 | Koker | G06F 9/5011 |
| 10,733,012 | B2 * | 8/2020 | Nugteren | G06F 8/451 |
| 10,796,397 | B2 * | 10/2020 | Valerio | G06F 9/30178 |
| 11,822,956 | B2 * | 11/2023 | Luo | G06T 1/60 |
| 11,954,062 | B2 * | 4/2024 | Ray | G06F 9/3887 |
| 11,995,737 | B2 * | 5/2024 | Koker | G06T 1/20 |

(Continued)

FOREIGN PATENT DOCUMENTS

KR        10-1799978  B1    11/2017

OTHER PUBLICATIONS

Final Office Action issued in U.S. Appl. No. 17/558,008, mailed Dec. 18, 2023, 16 pages.

(Continued)

*Primary Examiner* — Van H Nguyen

(57) ABSTRACT

A processing unit performs a dispatch walk of a set of thread groups based on a programmable access pattern. The access pattern is stored at a table that is programmed with the access pattern based upon a specified command. By using the command to program the table with different access patterns, the dispatch order of the set of thread groups is adapted to better suit the processing of different data sets, thereby reducing power consumption at the processing unit, and improving overall processing efficiency.

17 Claims, 4 Drawing Sheets

(56) References Cited

U.S. PATENT DOCUMENTS

| | | | |
|---|---|---|---|
| 2003/0200396 A1 | 10/2003 | Musumeci | |
| 2006/0184747 A1 | 8/2006 | Guthrie et al. | |
| 2009/0303245 A1 | 12/2009 | Soupikov et al. | |
| 2011/0213937 A1 | 9/2011 | Barry et al. | |
| 2012/0278558 A1 | 11/2012 | Dufter et al. | |
| 2012/0320069 A1* | 12/2012 | Lee | G06T 1/20 |
| | | | 345/505 |
| 2013/0265318 A1 | 10/2013 | Schneider | |
| 2015/0160970 A1 | 6/2015 | Nugteren et al. | |
| 2016/0239441 A1* | 8/2016 | Chun | G06F 13/18 |
| 2016/0364828 A1* | 12/2016 | Valerio | G06F 9/30178 |
| 2017/0124742 A1 | 5/2017 | Hasselgren et al. | |
| 2017/0178386 A1 | 6/2017 | Redshaw et al. | |
| 2018/0329712 A1 | 11/2018 | Palani et al. | |
| 2019/0324757 A1* | 10/2019 | Valerio | G06F 9/3867 |
| 2020/0327060 A1 | 10/2020 | Desai | |
| 2021/0141649 A1 | 5/2021 | Xu et al. | |
| 2022/0066931 A1* | 3/2022 | Ray | G06F 12/0811 |
| 2022/0156875 A1* | 5/2022 | Koker | G06F 9/5011 |
| 2023/0104199 A1* | 4/2023 | Volkov | G06T 15/06 |
| | | | 345/426 |

OTHER PUBLICATIONS

Office Action issued in U.S. Appl. No. 17/558,008, mailed Jun. 28, 2023, 22 pages.

Office Action issued in U.S. Appl. No. 17/558,008, mailed May 28, 2024, 18 pages.

International Preliminary Report on Patentability issued in Application No. PCT/US2022/053381, mailed Jul. 4, 2024, 8 pages.

Non-Final Office Action issued in U.S. Appl. No. 17/558,008, mailed Dec. 13, 2024, 24 pages.

Final Office Action issued in U.S. Appl. No. 17/558,008, mailed Jun. 30, 2025, 21 pages.

International Search Report and Written Opinion issued in Application No. PCT/US2022/053381, mailed Apr. 21, 2023, 11 pages.

Extended European Search Report mailed Nov. 27, 2025 for European Application No. 22912350.0, 10 pages.

Notice of Allowance mailed Oct. 1, 2025 for in U.S. Appl. No. 17/558,008, 6 pages.

* cited by examiner

600

RECEIVE PATTERN COMMAND ⟋602

SELECT AND STORE ACCESS PATTERN ⟋604

RECEIVE DISPATCH COMMAND ⟋606

WALK THREAD GROUP BASED ON STORED ACCESS PATTERN ⟋608

VARIABLE DISPATCH WALK

BACKGROUND

To improve processing efficiency, some processing systems employ one or more processing units to execute specified operations with specialized hardware. For example, some processing systems employ one or more graphics processing units (GPUs) to execute operations associated with the generation of images. To perform the specified operations, in at least some cases the processing unit hardware is configured to perform repeated operations (e.g., vector or matrix operations) on relatively large sets of data. For example, some GPUs employ shader hardware to perform repeated processing passes on image data in order to apply a specified texture or other image processing to a set of image data (e.g., pixels).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for performing, at a processing unit, a dispatch walk of a set of thread groups based on a programmable access pattern. The access pattern is stored at a table that is programmed with the access pattern based upon a specified command. By using the command to program the table with different access patterns, the dispatch order of the set of thread groups is adapted to better suit the processing of different data sets, thereby reducing power consumption at the processing unit, and improving overall processing efficiency.

To illustrate, in many cases, the data sets processed by the processing unit are larger than are able to be accommodated by at least some of the memory hierarchy of the processing unit. In such cases, the data sets and associated operations are divided into units referred to as threads, and the threads themselves are divided into sets referred to as thread groups (or sometimes, threadgroups). To perform a processing operation, the hardware of the processing unit accesses subsets of the thread groups in a specified sequence, referred to as dispatch order, and processes the accessed subsets in the dispatch order. To process some data subsets, the processing unit loads corresponding data into one or more levels of the processing unit's memory hierarchy, while transferring data associated with a previous subset to main memory. This loading and transfer process is referred to herein as a "data swap."

The overhead associated with a data swap (e.g., the loading and transferring of data) consumes power and other system resources. This overhead is reduced when the number of data swaps, or the amount of data moved for a particular data swap, is reduced. Furthermore, in some cases different thread groups share at least some data, such that processing those thread groups in sequence reduces one or both of the number of data swaps or the amount of data moved during a given data swap. However, the particular thread groups that share data differs based on the particular set of thread groups, the type of processing operations to be done on the thread groups, or a combination thereof. Conventionally, the thread groups are dispatched in a fixed specified order, without regard to the thread group to be processed or the processing operations to be done. Using the techniques described herein, thread groups are accessed and dispatched for processing based on a programmable access pattern. In some cases, the access pattern is programmed to reduce the number of data swaps, or the amount of data moved during one or more data swaps, thereby reducing the overall overhead associated with the data swaps. This in turn reduces power consumption at the processing unit and improves overall processing efficiency.

Figure 1:
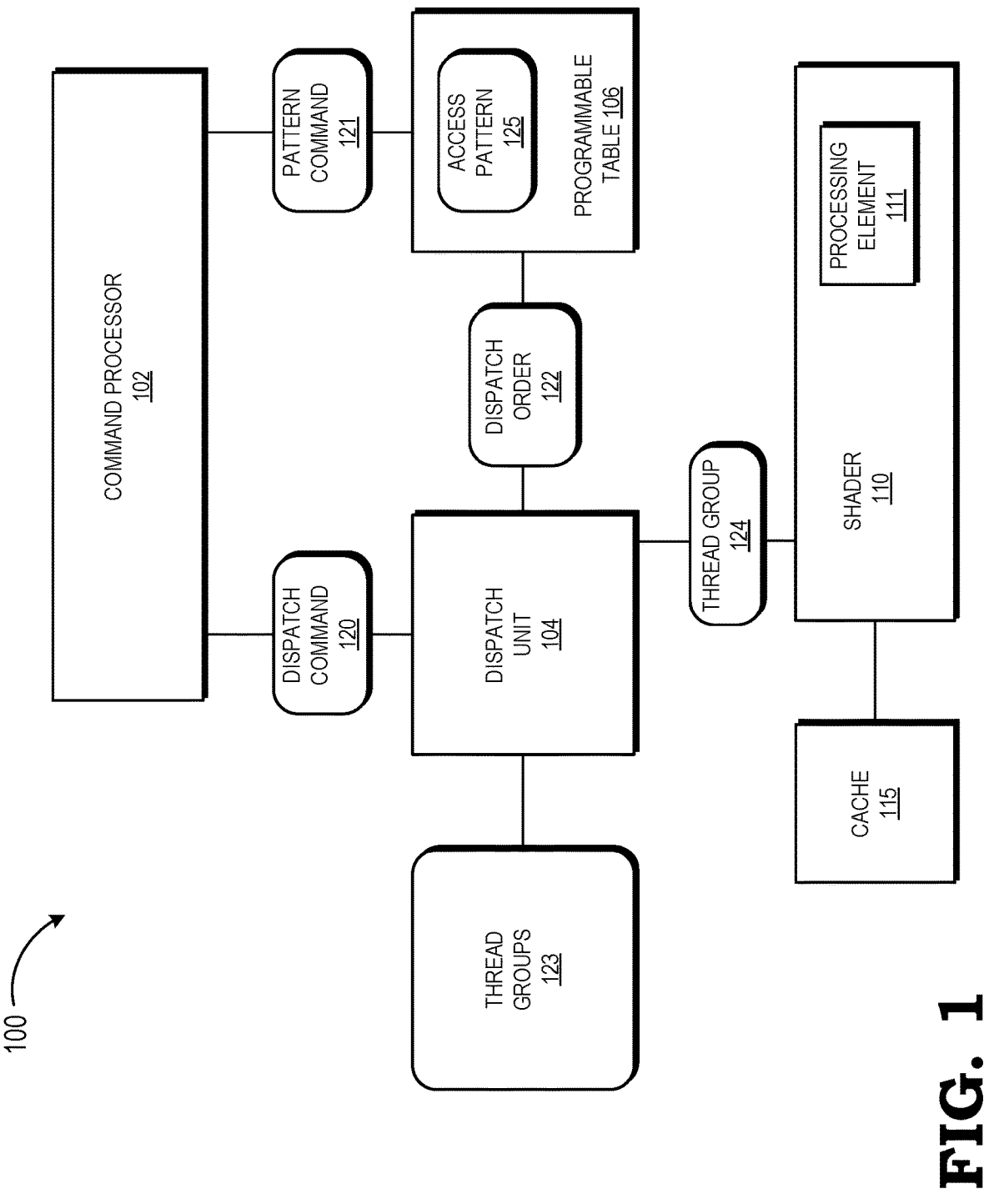
FIG. 1 is a block diagram of a processing unit that supports programmable dispatch walks in accordance with some embodiments.

FIG. 1 illustrates a block diagram of a processing unit 100 in accordance with some embodiments. The processing unit 100 is generally configured to execute sets of commands (e.g., draw commands) to carry out tasks on behalf of an electronic device. Accordingly, in different embodiments the processing unit 100 is incorporated into one of a variety of electronic devices, such as a desktop computer, laptop computer, server, smartphone, tablet, game console, and the like. For purposes of description, the embodiment is described with the assumption that the processing unit 100 is a graphics processing unit (GPU) configured to execute graphics and vector operations based on commands received from a central processing unit (CPU). However, in other embodiments the processing unit 100 is, or includes, a different type of processing unit, such as a parallel processor, a single instruction multiple data (SIMD) architecture processor, a single instruction multiple thread (SIMT) architecture processor, artificial intelligence processing unit, vector processing unit, machine learning processing unit, or other processing unit for performing tasks such as graphics, machine intelligence, vector processing, or compute operation tasks.

To execute the sets of commands received from the CPU, the processing unit 100 includes a command processor 102, a dispatch unit 104, a shader 110, and a cache 115. The command processor 102 is a set of hardware configured to receive the commands from the CPU and to prepare the received commands for processing. For example, in some embodiments the command processor 102 buffers the received commands, organizes the received commands into one or more queues for processing, performs operations to decode or otherwise interpret the received commands, and the like.

The dispatch unit 104 is a set of hardware configured to perform dispatch operations in response to dispatch commands (e.g., dispatch command 120) received from the command processor 102. Responsive to a dispatch command, the dispatch unit 104 accesses a set of thread groups

123 and dispatches subsets (e.g., thread group 124) of the thread groups to the shader 110 for processing. In some embodiments, the dispatch unit 104 dispatches the subsets of the thread groups 123 to the shader 110 in a particular order, designated dispatch order 122, wherein the dispatch order 122 is indicated by an access pattern 125 stored at a programmable table 106. That is, the access pattern 125 represents the pattern of how the thread groups 123 are accessed, and the dispatch order 122 is the order in which the thread groups 123 are dispatched to the shader 110. The dispatch order 122 is thus based on the access pattern 125.

In some embodiments, the programable table 106 is a set of registers, a content addressable memory (CAM) or other storage structure that is programmed based on pattern commands (e.g., pattern command 121). Each pattern command indicates an access pattern to be stored at the programmable table 106. In some embodiments, the pattern commands, such as pattern command 121, are issued by a device driver or other program, and are based on the particular thread groups 123 to be processed. As described further below, the device driver thereby tailors the access pattern 125, and the corresponding dispatch order 122, to reduce the number of data swaps, or the amount of data moved during one or more data swaps, thereby improving processing efficiency.

The shader 110 includes a plurality of processing elements (e.g., processing element 111) that together perform shading operations on thread groups (e.g., thread group 124) dispatched by the dispatch unit 104. In different embodiments, the processing elements of the shader 110 perform geometry operations, texture operations, tessellation operations, vertex operations, mesh operations, primitive operations, ray tracing operations, compute operations, and the like or any combination thereof, based on commands received from the command processor 102. In some embodiments, to perform these operations the processing elements each include one or more SIMD elements configured to execute the specified operations using the threads of the received thread groups.

The cache 115 stores data for the shader 110. Thus, in the course of executing shader operations, the shader 110 stores and retrieves data from the cache 115, wherein the stored and retrieved data is based on the particular thread group (or set of thread groups) being processed. For example, in some embodiments each thread of the thread group 124 corresponds to an individual pixel of an image, and the cache 115 stores data (e.g., pixel values) for each individual pixel, or a subset of the individual pixels, included in the thread group 124. In some embodiments, the processing unit 100 is associated with a memory hierarchy having multiple cache levels as well as a system memory (not shown), and the cache 115 represents one of the multiple cache levels (e.g., a Level 1 (L1) cache.

In some cases, when a new thread group is dispatched to the shader 110 by the dispatch unit 104, the shader 110 performs a data swap by loading data corresponding to the new thread group to the cache 115 and transferring data corresponding to the previous thread group to system memory. However, for some thread groups, the corresponding shader operations share at least some data. For example, in some embodiments each thread group of the thread groups 123 corresponds to a portion (e.g., a tile) of an image. For some shader operations, and for a given thread group 124, the shader 110 uses at least some pixel data from portions that adjoin the portion of the image associated with the thread group 124. Accordingly, by dispatching the thread groups 123 to the shader 110 in a particular order, the dispatch unit 104 is able to increase the likelihood that processing of a given thread group is able to use data already stored at the cache 115. This in turn reduces the amount of overhead associated with data swaps, reducing power consumption and increasing processing efficiency.

However, the way in which the shader operations share data between thread groups varies according to one or more of the data represented by the thread groups, the operations performed by the shader 110, or a combination thereof. For example, in some cases the shader operations share data between thread groups in one way for a particular type of texture operation but share data between thread groups differently for a different type of texture operation. As noted above, the dispatch order 122 is governed by the access pattern 125, because the access pattern 125 is the pattern according to which the thread groups 123 are accessed. Accordingly, by programming the access pattern 125 to a particular access pattern for the particular thread groups 123, a device driver or other program tailors the dispatch order 122 for the thread groups 123 to reduce the impact of data swaps, such as by reducing the amount of data loaded to the cache 115 when a new thread group 124 is dispatched for processing. For example, in some embodiments a programmer tests different access patterns for a given set of thread groups 123 and measures the impact of the data swaps for each of the different access patterns. For example, the programmer measures the number of cache lines of the cache 115 loaded or evicted when the thread groups 123 are processed at the shader 110. The programmer then selects the access pattern corresponding to the lowest impact (e.g., the fewest number of cache lines loaded or evicted). The programmer then programs the device driver or other program to issue the pattern command 121 to store the selected access pattern when the thread groups 123 are to be processed at the shader 110. The programmer thus ensures that the dispatch order 122 is based on an access pattern than reduces the impact of the data swaps, thereby reducing the overhead associated with the data swaps.

Figure 2:
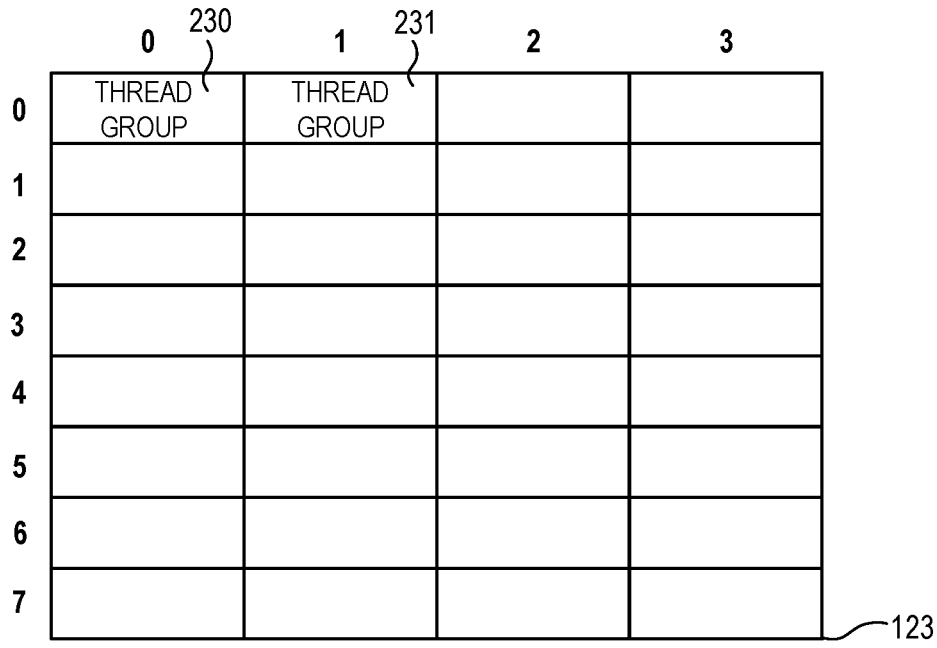
FIG. 2 is a diagram illustrating a set of thread groups to be processed at the processing unit of FIG. 1 in accordance with some embodiments.

FIG. 2 illustrates an example of the thread groups 123 in accordance with some embodiments. In the depicted example, the thread groups 123 are organized as a two-dimensional array having eight rows and four columns (that is, an 8×4 array). Each entry of the array is designated by the corresponding row and column numbers and each entry stores a different corresponding thread group. For example, entry (0,0) of the thread groups 123 stores thread group 230, while entry (0,2) stores thread group 231. Each thread group includes a plurality of threads, with each thread corresponding to a different data point, or set of data points, to be processed. For example, in some embodiments, the thread groups 123 represent a two-dimensional image, with each entry storing the thread groups corresponding to portion of the image, and each thread of the thread groups corresponding to a pixel of the associated image portion. Further, in some embodiments adjoining thread groups of the thread groups 123 correspond to adjoining portions of the image. Thus, for example, the entry (0,0) (i.e., thread group 230) stores the threads corresponding to the pixels located at the top left portion of the image, and the entry (0,1) stores the threads corresponding to the portion of the image to the immediate right of the top left portion.

In other embodiments, the thread groups 123 represent non-image data. For example, in some embodiments each thread of the thread groups 123 represents a corresponding node of a neural network or other machine learning network. In still other embodiments, each thread of the thread groups 123 represents an entry of a matrix. Further, it will be appreciated that in some embodiments the thread groups 123 are organized in an array having more or fewer than two dimensions. For example, in some embodiments, the thread groups 123 are organized as a three-dimensional array with each thread of the thread groups 123 corresponding to a point in a three-dimensional space or volume, and the access pattern 125 indicates a three-dimensional access pattern.

In operation, the dispatch unit 104 dispatches the thread groups 123 to the shader 110 one at a time in a particular order, referred to as the dispatch order 122. In response to an indication that the shader 110 has completed processing a dispatched thread group, the dispatch unit 104 dispatches the next thread group in the dispatch order 122, until all of the thread groups 123 have been processed at the shader 110. This process of dispatching the thread groups 123 according to the dispatch order 122 is referred to as the dispatch unit 104 "walking" the thread groups 123, or sometimes as the dispatch unit 104 performing a "dispatch walk" with respect to the thread groups 123. It will be appreciated that the dispatch order 122 is based on the pattern with which the dispatch unit 104 accesses the thread groups 123, and that this pattern is indicated by the access pattern 125 programmed at the programmable table 106.

Figure 3:
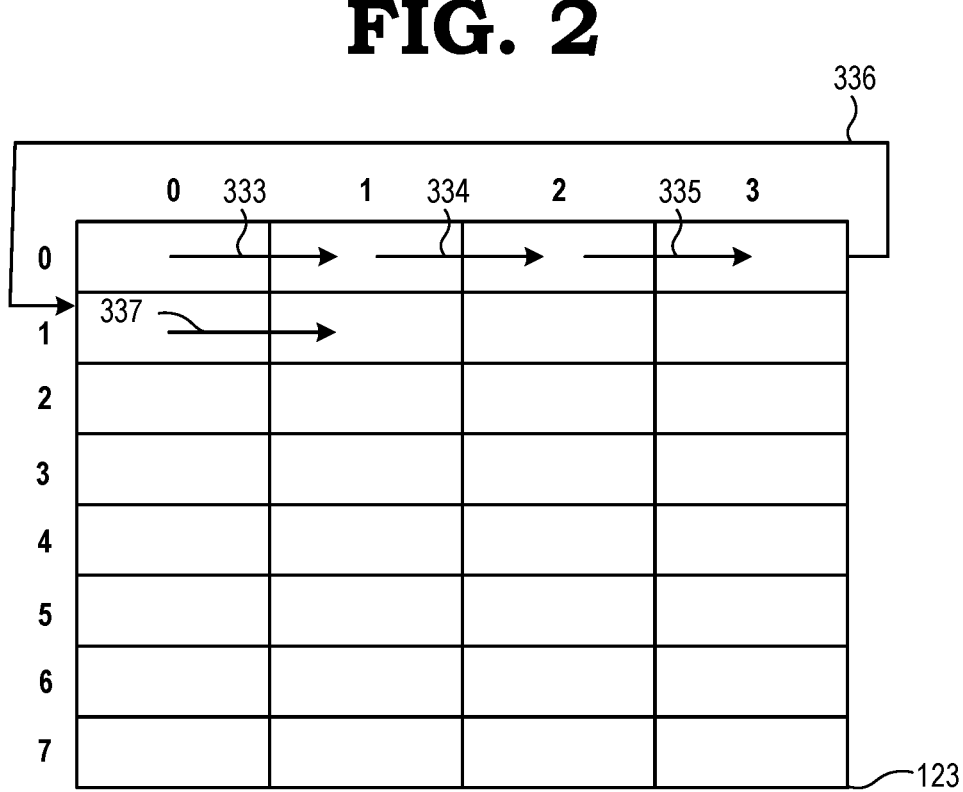
FIG. 3 is a diagram illustrating an example of a dispatch walk of the set of thread groups of FIG. 2 in accordance with some embodiments.

An example access pattern and corresponding dispatch walk is illustrated at FIG. 3 in accordance with some embodiments. In particular, FIG. 3 illustrates a dispatch walk according to an access pattern sometimes referred to as a typewriter pattern, where the dispatch order begins at the left-most entry of a row, proceeds through each entry of the row until reaching the right-most entry of the row, and then proceeds to the left-most entry of the next row.

Thus, in the depicted example, based on the access pattern 125 indicating a typewriter pattern, the dispatch unit 104 first dispatches the thread group at entry (0,0) of the thread groups 123 to the shader 110. As indicated by arrow 333, in response to the shader 110 indicating processing of the previous thread group is complete, the dispatch unit 104 next dispatches the thread group at entry (0,1). Next, as illustrated by arrow 334, the dispatch unit 104 dispatches the thread group at entry (0, 2). The dispatch unit 104 then completes dispatching of row 0 of the thread groups 123 by dispatching the thread groups at the entry (0,3), as represented by the arrow 335.

After completing dispatch of row 0, the dispatch unit 104 moves to the first column of the next row (i.e., row 1), as indicated by arrow 336. The dispatch unit 104 dispatches the thread group at entry (1,0) to the shader 110. In response to the shader 110 indicating processing of the previous thread group is complete, the dispatch unit 104 next dispatches the thread group at entry (1,1) as shown by arrow 337. The dispatch unit 104 continues to dispatch the thread groups 123 according to this typewriter fashion, until finally dispatching the thread group at entry (7,3).

Figure 4:
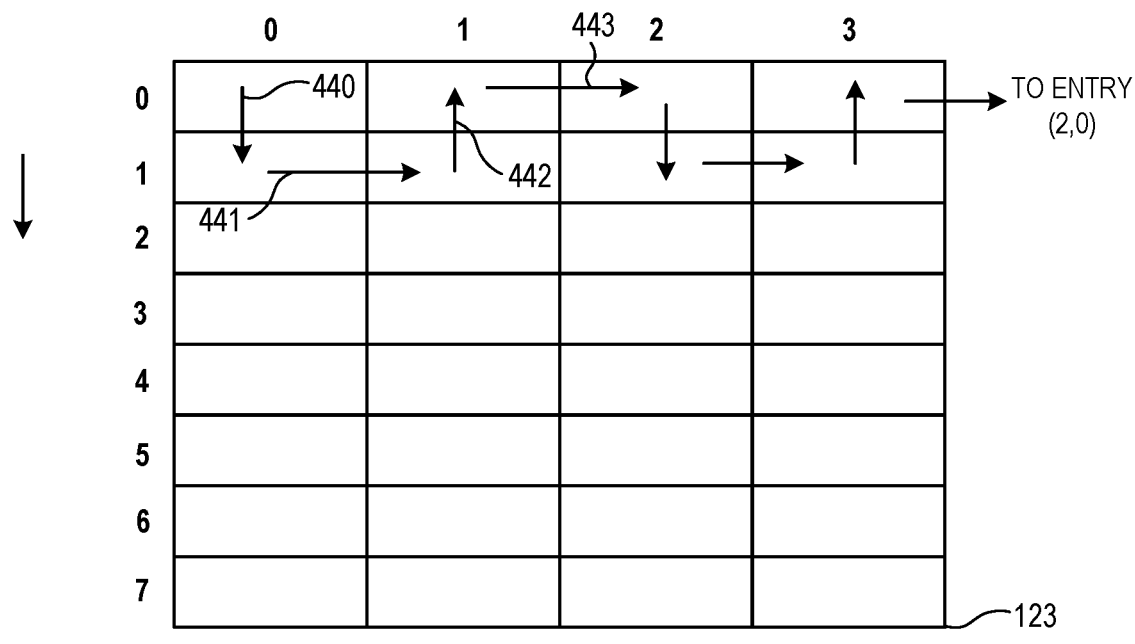
FIG. 4 is a diagram illustrating another example of a dispatch walk of the set of thread groups of FIG. 2 in accordance with some embodiments.

FIG. 4 illustrates a different example access pattern and corresponding dispatch walk in accordance with some embodiments. In particular, FIG. 4 illustrates a dispatch walk according to an access pattern defined by a first order Hilbert curve, where the dispatch order begins at the left-most entry of a row, proceeds through the corresponding entry of the next row (that is, moves down the column one row), then dispatches the corresponding entry of the next column (that is, moves one column over), and then dispatches the entry in the same column and the previous row (that is, moves up the column one row).

Thus, in the depicted example, based on the access pattern 125 indicating a first order Hilbert pattern, the dispatch unit 104 first dispatches the thread group at entry (0,0) of the thread groups 123 to the shader 110. As indicated by arrow 440, in response to the shader 110 indicating processing of the previous thread group is complete, the dispatch unit 104 next dispatches the thread group at entry (1,0). Next, as illustrated by arrow 441, the dispatch unit 104 dispatches the thread group at entry (1, 1). The dispatch unit 104 then dispatches the thread group at entry (0, 1), as indicated by the arrow 443. Next, the dispatch unit 104 dispatches the thread group at entry (0, 2). The dispatch unit 104 continues to follow this pattern until it dispatches the thread group at entry (0, 3). The dispatch unit 104 then moves to entry (2,0) and repeats the pattern. The dispatch unit 104 continues to repeat the first order Hilbert curve pattern until all of the thread groups 123 have been dispatched.

It will be appreciated that the access patterns and corresponding dispatch orders illustrated at FIGS. 3 and 4 are examples only, and that in other embodiments the programmable table 106 is programmed with different access patterns. For example, in different embodiments the access pattern 125 represents an N-order Hilbert curve pattern, where N is an integer. In other embodiments, the access pattern represents a Morton curve pattern, another space-filling curve pattern, a z-order walking pattern, a ping-pong walk pattern, and the like. Further, in different embodiments the access pattern 125 represents the pattern in different ways. For example, in some embodiments the access pattern 125 sets forth an initial entry of the thread groups 123 and a set of rules for traversing the entries of the thread groups 123, and the dispatch unit 104 determines the dispatch order 122 by starting at the initial entry and proceeding to dispatch entries of the thread groups 123 according to the indicated rules. In other embodiments, the access pattern 125 sets forth an ordered list of the entries the thread groups 123, and the dispatch unit 104 determines the dispatch order 122 by proceeding in order along the list of entries set forth by the access pattern 125.

As is apparent from the examples of FIGS. 3 and 4, different access patterns result in different sequences of thread groups being dispatched to the shader 110. These different sequences, in turn, result in different patterns of data swaps at the cache 115. For example, in some cases the shader operations implanted at the shader 110 are such that the operations for a given thread group share a relatively higher amount of data with the operations for the thread group in the row below or above the given thread group than in the column to the right or left of the given thread group. Thus, for example, the operations for the thread group at entry (0,0) share more data with operations for the thread group at entry (1,0) than with operations for the thread group at entry (0,1). Accordingly, dispatching the thread group at entry (1,0) immediately after the thread group at entry (0,0) will result in less data being swapped at the cache 115 than dispatching the thread group at entry (0,1) immediately after the thread group at entry (0,0).

Thus, in this example, dispatching thread groups according to the Hilbert curve access pattern illustrated at FIG. 4 will result in overall less data swaps than dispatching thread groups according to the typewriter access pattern illustrated at FIG. 3, and therefore using the Hilbert curve access pattern lowers processing overhead at the processing unit 100 relative to using the typewriter access pattern. However, for some other types of shader operations, or some other instances of the thread groups 123, or any combination thereof, the typewriter access pattern results in less data swaps. Accordingly, because the dispatch order 122 is based on the access pattern 125, the processing unit 100 allows a device driver or other program change the dispatch order 122 by storing different access patterns 125 at the programmable table 106. This allows a programmer to tailor the access pattern 125 to the particular type of shader operation or instance of the thread groups 123, improving overall processing efficiency.

Figure 5:
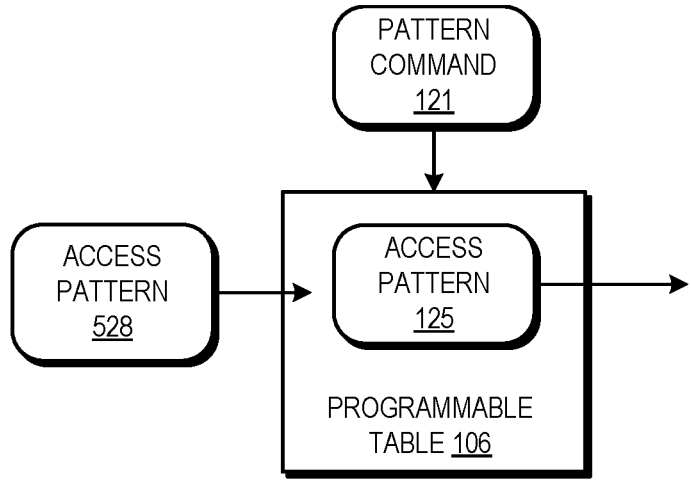
FIG. 5 is a block diagram illustrating an example of programming an access pattern for a dispatch walk at the processing unit of FIG. 1 in accordance with some embodiments.

FIG. 5 is a block diagram illustrating an example of programming the programmable table 106 to store a new access pattern in accordance with some embodiments. In the depicted example, the programmable table 106 stores the access pattern 125. In response to receiving the pattern command 121, the programmable table 106 replaces the access pattern 125 with an access pattern 528. In at least some embodiments, the access pattern 528 is different from the access pattern 125. For example, in some embodiments the access pattern 125 indicates a typewriter access pattern, while the access pattern 528 indicates an N-order Hilbert curve access pattern.

In different embodiments, the pattern command 121 indicates the access pattern 528 in different ways. For example, in some embodiments, the pattern command 121 includes a field that reflects the access pattern 528 itself, such as by indicating a set of rules that designate the implementation of the access pattern 528. In other embodiments, the processing unit 100 stores a set of pre-defined access patterns, and the pattern command 121 indicates a selection of one of the set of pre-defined access patterns. In response to the pattern command 121, the command processor 102 or other module transfers the selected access pattern to the programmable table 106. In still other embodiments, the programmable table 106 itself stores different access patterns, and the pattern command 121 indicates which of the stored access patterns is to be used by the dispatch unit 104 to determine the access pattern 528.

It will be appreciated that in some embodiments the pattern command 121 is not a separate command, but instead is a field of the dispatch command 120. For example, in at least one embodiment a field of the dispatch command 120 indicates a selected access pattern, and in response to the dispatch command 120 the programmable table 106 stores the selected access pattern. Thus, in some embodiments a single command is used both to program the programmable table 106 with an access pattern, and to trigger dispatch of the thread groups 123 to the shader 110.

Figure 6:
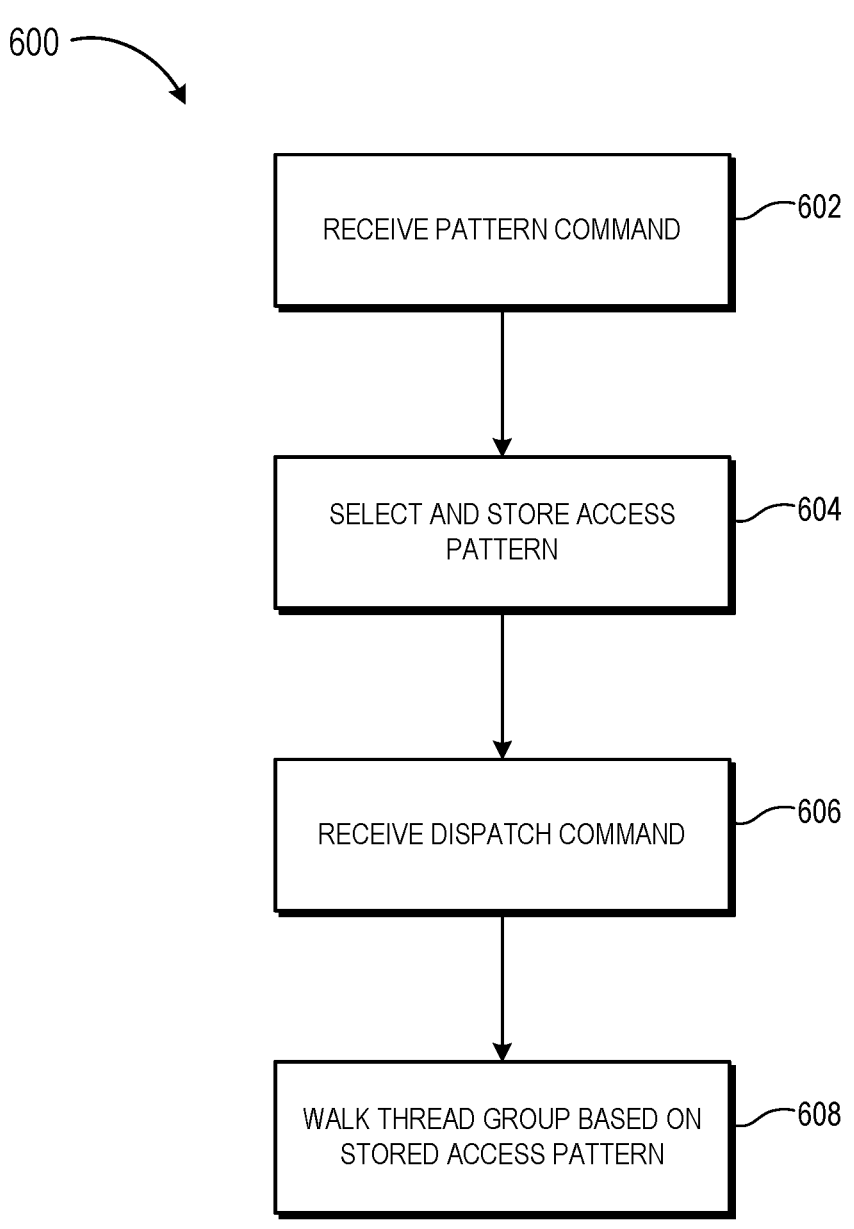
FIG. 6 is a flow diagram of a method of performing a programmable dispatch at a processing unit in accordance with some embodiments.

FIG. 6 is a flow diagram of a method 600 of dispatching thread groups to one or more processing elements based on a programmable access pattern in accordance with some embodiments. The method 600 is described with respect to an example implementation at the processing unit 100 of FIG. 1, but it will be appreciated that in other embodiments the method 600 is implemented at other processing units having different configurations.

At block 602, the programmable table 106 receives the pattern command 121. In response, at block 604, the programmable table 106 selects and stores the access pattern 121. For example, in some embodiments the processing unit 100 stores a set of pre-defined access patterns, and the pattern command 121 indicates a selection of one of the set of pre-defined access patterns. In response to the pattern command 121, programmable table stores the selected access pattern indicated by the pattern command 121. In other embodiments, the pattern command 121 itself indicates access pattern 125 is a field of the command.

At block 606, the dispatch unit 104 receives the dispatch command 120. In response, at block 608, the dispatch unit 104 performs a dispatch walk of the thread groups 123 according to the access pattern 125 that was programmed at block 604. That is, the dispatch unit 104 uses the access pattern 125 to determine the dispatch order 122 of the thread groups 123. The dispatch unit 104 dispatches individual thread groups to the shader 110 according to the determined dispatch order.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A non-transitory computer readable medium embodying a set of executable instructions, the set of executable instructions to manipulate at least one processor to:

in response to a first dispatch command, dispatch a first plurality of thread groups to a set of processing circuits having access to a cache in a first dispatch order based on shared data to be used by some thread groups but not all thread groups of the first plurality of thread groups, wherein the first dispatch order comprises dispatching a first thread group of the first plurality of thread groups immediately after a second thread group of the first plurality of thread groups based on an amount of data stored at the cache that is shared by the first thread group and the second thread group; and in response to a second dispatch command, dispatch a second plurality of thread groups to the set of processing circuits in a second dispatch order, the second dispatch order different from the first dispatch order.

2. The non-transitory computer readable medium of claim 1, wherein the set of executable instructions are to manipulate at least one processor to:

store an access pattern that indicates the first dispatch order at a programmable table.

3. The non-transitory computer readable medium of claim 2, wherein the set of executable instructions are to manipulate at least one processor to:

store the access pattern at a programmable table in response to a pattern command.

4. The non-transitory computer readable medium of claim 2, wherein:

the second dispatch order is based on a second access pattern that is different from the access pattern.

5. The non-transitory computer readable medium of claim 1, wherein:

the first plurality of thread groups is organized according to at least two dimensions.

6. The non-transitory computer readable medium of claim 1, wherein the first dispatch order comprises one of:

a Hilbert curve, Morton curve pattern, or a z-order walking pattern.

7. The non-transitory computer readable medium of claim 1, wherein:

the set of processing circuits comprise a shader of a graphics processing unit.

8. A method, comprising:

in response to receiving a first command, dispatching a first plurality of thread groups to a set of processing circuits having access to a cache in a first dispatch order based on shared data to be used by some thread groups but not all thread groups of the first plurality of thread groups, wherein the first dispatch order comprises dispatching a first thread group of the first plurality of thread groups immediately after a second thread group of the first plurality of thread groups based on an amount of data stored at the cache that is shared by the first thread group and the second thread group; and in response to receiving a second command, dispatching a second plurality of thread groups in a second dispatch order to the set of processing circuits, the second dispatch order different from the first dispatch order.

9. The method of claim 8, wherein:

the first plurality of thread groups is organized according to at least two dimensions.

10. The method of claim 8, wherein:

an access pattern that indicates the first dispatch order is stored at a programmable table.

11. The method of claim 8, wherein:

the first dispatch order is determined based on data to be used by the first plurality of thread groups as part of one or more data swaps.

12. The method of claim 8, wherein the first dispatch order comprises one of:

a Hilbert curve, Morton curve pattern, or a z-order walking pattern.

13. A processor comprising:

a set of processing circuits having access to a cache; and a dispatch unit configured to:

in response to a first dispatch command, dispatch a first plurality of thread groups to a set of processing circuits in a first dispatch order based on shared data to be used by some thread groups but not all thread groups of the first plurality of thread groups, wherein the first dispatch order comprises dispatching a first thread group of the first plurality of thread groups immediately after a second thread group of the first plurality of thread groups based on an amount of data stored at the cache that is shared by the first thread group and the second thread group; and in response to a second dispatch command, dispatch a second plurality of thread groups to the set of processing circuits in a second dispatch order, the second dispatch order different from the first dispatch order.

14. The processor of claim 13, further comprising:

a programmable table to store a plurality of access patterns including an access pattern that indicates the first dispatch order.

15. The processor of claim 13, wherein:

the first plurality of thread groups is organized according to at least three dimensions.

16. The processor of claim 13, wherein the first dispatch order comprises one of:

a Hilbert curve, Morton curve pattern, or a z-order walking pattern.

17. The processor of claim 13, wherein:

the processor comprises a graphics processing unit and the set of processing circuits comprise a shader.

* * * * *